(12) United States Patent
Tsuda et al.

(10) Patent No.: US 7,968,039 B2
(45) Date of Patent: Jun. 28, 2011

(54) METHOD OF PRODUCING PRESSURE-SENSITIVE ADHESIVE SHEET

(75) Inventors: Kazuhiro Tsuda, Warabi (JP); Osamu Kanazawa, Warabi (JP); Kiichiro Kato, Warabi (JP)

(73) Assignee: Lintec Corporation, Tokyo (JP)

( * ) Notice: Subject to any disclaimer, the term of this patent is extended or adjusted under 35 U.S.C. 154(b) by 636 days.

(21) Appl. No.: 11/630,321

(22) PCT Filed: Jun. 8, 2005

(86) PCT No.: PCT/JP2005/010512
§ 371 (c)(1),
(2), (4) Date: Feb. 8, 2007

(87) PCT Pub. No.: WO2005/123860
PCT Pub. Date: Dec. 29, 2005

(65) Prior Publication Data
US 2007/0227653 A1    Oct. 4, 2007

(30) Foreign Application Priority Data
Jun. 22, 2004 (JP) ................................ 2004-183727

(51) Int. Cl.
*B29C 35/08* (2006.01)
*B29C 63/00* (2006.01)
*H05B 6/00* (2006.01)
*B32B 37/00* (2006.01)
*D01F 8/00* (2006.01)
*B32B 3/10* (2006.01)
*B32B 9/00* (2006.01)
*B32B 33/00* (2006.01)

(52) U.S. Cl. .................... 264/400; 264/482; 264/171.1; 428/131; 428/138; 428/40.1

(58) Field of Classification Search ................. None
See application file for complete search history.

(56) References Cited

U.S. PATENT DOCUMENTS
3,949,134 A * 4/1976 Willdorf ........................ 428/215
(Continued)

FOREIGN PATENT DOCUMENTS
EP    1 267 205    12/2002
(Continued)

OTHER PUBLICATIONS
Translation of JP 1-125345 U.*
(Continued)

*Primary Examiner* — Christina Johnson
*Assistant Examiner* — Benjamin Schiffman
(74) *Attorney, Agent, or Firm* — Posz Law Group, PLC

(57) ABSTRACT

To produce a pressure-sensitive adhesive sheet according to which air entrapment and blistering can be prevented or eliminated through through-holes, and yet the through-holes are not readily visible at a substrate surface, a pressure-sensitive adhesive surface of a pressure-sensitive adhesive layer 12 in a laminate comprising a substrate 11 and the pressure-sensitive adhesive layer 12 is irradiated with a $CO_2$ laser having a pulse width of from 1 to 140 μsec, a pulse energy at each processing point of from 0.01 to 3.0 mJ, and a beam spot diameter at each processing point of from 30 to 160 μm, so as to form through-holes 2 having a diameter at the surface of the substrate 11 of from 0.1 to 42 μm at a hole density of from 30 to 50,000 per 100 $cm^2$.

9 Claims, 2 Drawing Sheets

U.S. PATENT DOCUMENTS

| | | | |
|---|---|---|---|
| 4,895,745 A * | 1/1990 | Vesley et al. | 428/40.4 |
| 5,779,832 A * | 7/1998 | Kocher | 156/73.1 |
| 6,110,595 A * | 8/2000 | Suzuki et al. | 430/270.11 |
| 6,388,231 B1 * | 5/2002 | Andrews | 219/121.69 |
| 6,441,340 B1 * | 8/2002 | Varriano-Marston | 219/121.7 |
| 6,890,617 B1 | 5/2005 | Yamaguchi et al. | |
| 2003/0059563 A1 | 3/2003 | Bourdelais et al. | |
| 2005/0074578 A1 | 4/2005 | Yamaguchi et al. | |
| 2006/0222813 A1 | 10/2006 | Kato et al. | |
| 2006/0228511 A1 | 10/2006 | Bourdelais et al. | |

FOREIGN PATENT DOCUMENTS

| | | | |
|---|---|---|---|
| EP | 1 577 358 A1 | | 9/2005 |
| EP | 1 270 694 | | 10/2006 |
| JP | 1-125345 U | * | 8/1989 |
| JP | 02-107682 | | 4/1990 |
| JP | 04-055489 | | 2/1992 |
| JP | 4-100235 | | 8/1992 |
| JP | 2003-129014 | | 5/2003 |
| JP | 2003-183602 | | 7/2003 |
| JP | 2004-002805 | | 1/2004 |
| WO | WO 01/51580 | | 7/2001 |
| WO | WO 2004/061032 | | 7/2004 |

OTHER PUBLICATIONS

Kancharla et al., Fabrication of Biodegradable Polymeric Micro-Devices Using Laser Micromachining, May 2002, Biomedical Microdevices vol. 4, Issue 2, pp. 105-109.*

Snakenborg et al., Microstructure fabrication with a CO2 laser system, Oct. 15, 2003, Journal of Micromechanics and Microengineering, pp. 182-189.*

Gan, E.K.W.; Zheng, H.Y.; Lim, G.C., "Laser drilling of micro-vias in PCB substrates," Electronics Packaging Technology Conference, 2000. (EPTC 2000). Proceedings of 3rd , vol., No., pp. 321-326, 2000.*

Definition of "laminated", Oxford English Dictionary, 2010.*

International Search Report for corresponding International application No. PCT/JP2005/010512.

Communication issued from the European Patent Office on Feb. 5, 2009 for the corresponding European patent application No. 05748624.3—2102.

* cited by examiner (a)

(b)

ature adhesive sheet
METHOD OF PRODUCING PRESSURE-SENSITIVE ADHESIVE SHEET

TECHNICAL FIELD

The present invention relates to a method of producing a pressure-sensitive adhesive sheet according to which air entrapment and blistering can be prevented or eliminated.

BACKGROUND ART

When sticking a pressure-sensitive adhesive sheet onto an adherend by hand, entrapment of air between the adherend and the pressure-sensitive adhesive surface may occur, marring the appearance of the pressure-sensitive adhesive sheet. Such air entrapment is particularly prone to occur in the case that the pressure-sensitive adhesive sheet has a large area.

To eliminate problems with appearance of a pressure-sensitive adhesive sheet due to air entrapment, another pressure-sensitive adhesive sheet may be stuck on in place of the preceded pressure-sensitive adhesive sheet, or the attached pressure-sensitive adhesive sheet may be peeled off and then reattached, or a hole may be made with a needle in a blistered portion of the pressure-sensitive adhesive sheet so as to allow the air to escape. However, in the case of sticking on in place of pressure-sensitive adhesive sheet, effort is required, and furthermore the cost is increased; moreover, in the case of reattaching the original pressure-sensitive adhesive sheet, problems often arise such as the pressure-sensitive adhesive sheet tearing, or wrinkles forming on the surface, or the adhesiveness dropping. On the other hand, the method of making a hole with a needle mars the appearance of the pressure-sensitive adhesive sheet.

To prevent air entrapment from occurring, there is a method in which water is put onto the adherend or the pressure-sensitive adhesive surface in advance before the two are stuck together; however, in the case of sticking on a pressure-sensitive adhesive sheet having large dimensions such as a safety film stuck onto a window, a decorative film or a marking film, much time and effort is required. Moreover, there is a method in which air entrapment is prevented from occurring by sticking on the pressure-sensitive adhesive sheet using a device rather than by hand; however, depending on the use of the pressure-sensitive adhesive sheet or the site or shape of the adherend, it may not be possible to use such a device for sticking on the pressure-sensitive adhesive sheet.

Meanwhile, a resin material such as an acrylic resin, an ABS resin, a polystyrene resin or a polycarbonate resin may emit a gas upon heating or even with no heating; in the case of sticking a pressure-sensitive adhesive sheet onto an adherend made of such a resin material, blistering may occur on the pressure-sensitive adhesive sheet due to the gas emitted from the adherend.

Moreover, in the case of sticking a pressure-sensitive adhesive sheet onto an adherend made of a resin through which gas readily permeates, gas that has permeated through may build up between the adherend and the pressure-sensitive adhesive sheet, so that the pressure-sensitive adhesive sheet blisters or peels off. For example, in the case that a marking sheet is stuck onto a motorbike gasoline tank made of polyethylene resin, vapor of gasoline in the gasoline tank may vaporize so as to permeate through the polyethylene resin layer of the gasoline tank, so that the marking sheet blisters or peels off, bringing about an undesirable situation such as the appearance being marred.

To solve such problems, with a pressure-sensitive adhesive sheet described in Japanese Patent Application Laid-open No. H2-107682, a substrate and a pressure-sensitive adhesive layer are subjected to punching processing using a blade die and a hole die so as to form through-holes of diameter from 0.2 to 1.0 mm therein, and with a pressure-sensitive adhesive sheet described in Japanese Utility Model Application Laid-open No. H4-100235, a substrate and a pressure-sensitive adhesive layer are subjected to perforation processing using a hot needle so as to form through-holes of diameter from 0.05 to 0.15 mm therein; air or gas escapes from these through-holes to the outside, whereby air entrapment and blistering of the pressure-sensitive adhesive sheet are prevented.

DISCLOSURE OF THE INVENTION

Problem to be Solved by the Invention

However, with a pressure-sensitive adhesive sheet as described above, the through-holes can be seen clearly with the naked eye, and hence the appearance of the pressure-sensitive adhesive sheet has not necessarily been good. Moreover, there has been a problem that if liquid such as water or gasoline becomes attached to the pressure-sensitive adhesive sheet after the pressure-sensitive adhesive sheet has been stuck onto an adherend, then this liquid may enter into the through-holes, causing the through-hole portions (portions around the peripheries of the through-holes) to swell or the like so that the appearance of the pressure-sensitive adhesive sheet is marred.

The present invention has been devised in view of the above state of affairs; it is an object of the present invention to provide a method of producing a pressure-sensitive adhesive sheet according to which air entrapment and blistering can be prevented or eliminated through through-holes, and yet the through-holes are not readily visible at a substrate surface.

Means for Solving the Problem

To attain the above object, firstly, the present invention provides a method of producing a pressure-sensitive adhesive sheet that comprises at least a substrate and a pressure-sensitive adhesive layer, the method characterized by irradiating with a $CO_2$ laser having a pulse width of from 1 to 140 μsec, a pulse energy at each processing point of from 0.01 to 3.0 mJ, and a beam spot diameter at each processing point of from 30 to 160 μm, so as to form through-holes having a diameter in the substrate and the pressure-sensitive adhesive layer of from 0.1 to 200 μm and a diameter at a surface of the substrate of from 0.1 to 42 μm at a hole density of from 30 to 50,000 per 100 $cm^2$ (invention 1).

Note that in the present specification, "sheet" is deemed to include the idea of a film, and "film" is deemed to include the idea of a sheet.

For a pressure-sensitive adhesive sheet obtained through the method of producing a pressure-sensitive adhesive sheet according to the above invention (invention 1), the through-holes are not readily visible with the naked eye at the substrate surface, and hence the appearance is excellent.

In the case of the above invention (invention 1), the irradiation may be carried out with a $CO_2$ laser having a pulse width of from 1 to 100 μsec, a pulse energy at each processing point of from 0.01 to 2.1 mJ, and a beam spot diameter at each processing point of from-30 to 90 μm, so as to form the through-holes such as to have a diameter in the substrate and the pressure-sensitive adhesive layer of from 0.1 to 125 μm (invention 2).

For a pressure-sensitive adhesive sheet obtained through the method of producing a pressure-sensitive adhesive sheet according to the above invention (invention 2), even in the case that liquid such as water or gasoline becomes attached to the pressure-sensitive adhesive sheet after the pressure-sensitive adhesive sheet has been stuck onto an adherend, entering of this liquid into the through-holes and swelling the through-hole portions (portions around the peripheries of the through-holes) can be prevented, and hence the good appearance of the pressure-sensitive adhesive sheet can be maintained.

In the case of the above invention (invention 1), the irradiation may be carried out with a $CO_2$ laser having a pulse width of from 1 to 70 μsec, a pulse energy at each processing point of from 0.01 to 1.5 mJ, and a beam spot diameter at each processing point of from 30 to 60 μm, so as to form the through-holes such as to have a diameter in the substrate and the pressure-sensitive adhesive layer of from 0.1 to 85 μm (invention 3).

For a pressure-sensitive adhesive sheet obtained through the method of producing a pressure-sensitive adhesive sheet according to the above invention (invention 3), even if stretched by an elongation of up to 3%, the through-holes are not readily visible with the naked eye at the substrate surface, and hence the appearance is excellent.

In the case of the above inventions (inventions 1 to 3), preferably, a pressure-sensitive adhesive surface of the pressure-sensitive adhesive layer is irradiated directly with the $CO_2$ laser (invention 4)

In the case that a third layer such as a release liner is laminated on the pressure-sensitive adhesive layer, if the pressure-sensitive adhesive layer is irradiated with the laser via this third layer, then depending on the material of the third layer, melted matter (dross) formed from the third layer may cause widening of the openings of the through-holes in the pressure-sensitive adhesive layer, and hence the degree of precision of the diameter and the hole density of the through-holes formed in the pressure-sensitive adhesive sheet maybe lowered. Moreover, if the openings of the through-holes in the pressure-sensitive adhesive layer are widened in this way, then the space inside the through-holes will become bigger, and hence after the pressure-sensitive adhesive sheet has been stuck onto an adherend, air in the through-holes or water or the like entering into the through-holes may have some effect on the surface of the pressure-sensitive adhesive sheet.

According to the above invention (invention 4), widening of the openings of the through-holes in the pressure-sensitive adhesive layer due to such a third layer is avoided, and hence through-holes for which the degree of precision of the diameter and the hole density is high and the space inside the through-holes is small can be formed. Moreover, by making a third layer not be present therebetween, the laser irradiation time can be shortened, or the laser output energy can be reduced. If the laser output energy is reduced, then thermal damage on the pressure-sensitive adhesive sheet will be reduced, and hence it will be possible to form through-holes of uniform shape with little dross and so on.

In the case of the above inventions (inventions 1 to 4), preferably, the substrate has a surface roughness (Ra) of not less than 0.03 μm, a lightness (L*) in the L*a*b* color system of not more than 60 in the case of having a chroma (C*) of not more than 60 and a lightness (L*) of not more than 85 in the case of having a chroma (C*) greater than 60, and a contrast ratio of not less than 90% (invention 5).

Through the substrate satisfying the above conditions, the through-holes become invisible to the naked eye at the substrate surface, and hence the appearance of the pressure-sensitive adhesive sheet is further improved.

Advantageous Effect of the Invention

According to the method of producing a pressure-sensitive adhesive sheet of the present invention, there can be obtained a pressure-sensitive adhesive sheet for which air entrapment and blistering can be prevented or eliminated through through-holes, and yet the through-holes are not readily visible at a substrate surface, and hence the appearance is excellent.

EXPLANATION OF REFERENCE NUMERALS

1: pressure-sensitive adhesive sheet
   11 : substrate
   12 : pressure-sensitive adhesive layer
   13 : release liner
2 : through-hole

BEST MODE FOR CARRYING OUT THE INVENTION

Following is a description of an embodiment of the present invention.

A method of producing a pressure-sensitive adhesive sheet according to an embodiment of the present invention will be described with reference to FIGS. 1(*a*) to (*f*).

Figure 1:
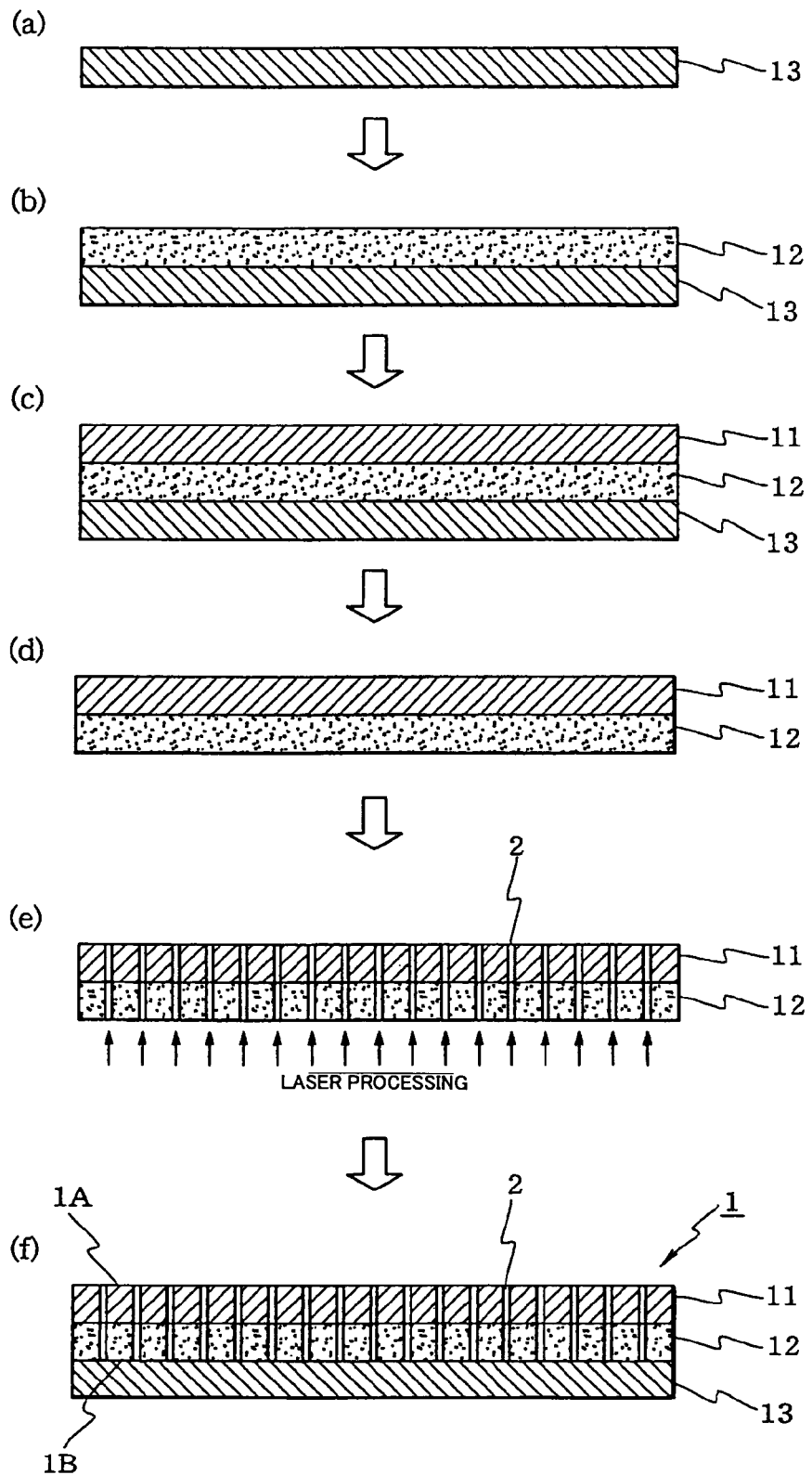
FIG. 1 is a sectional view of a pressure-sensitive adhesive sheet according to an embodiment of the present invention.

In the present embodiment, first, as shown in FIG. 1(*a*), a release liner 13 is prepared. There are no particular limitations on the material of there lease liner 13; for example, a film or foamed film made of a resin such as polyethylene terephthalate, polypropylene or polyethylene, or paper such as glassine, coated paper or laminated paper that has been subjected to release treatment with a release agent such as a silicone type one, a fluorine type one or a long chain alkyl group-containing carbamate can be used.

The thickness of the release liner 13 is generally approximately from 10 to 250 μm, preferably approximately from 20 to 200 μm. Moreover, the thickness of the release agent in the release liner 13 is generally from 0.05 to 5 μm, preferably from 0.1 to 3 μm.

As shown in FIG. 1(*b*), a pressure-sensitive adhesive layer 12 is formed on the release treated surface of the release liner 13. There are no particular limitations on the type of the pressure-sensitive adhesive constituting the pressure-sensitive adhesive layer 12 so long as through-holes, described below, can be formed therein; the pressure-sensitive adhesive may be any of an acrylic type, a polyester type, a polyurethane type, a rubber type, a silicone type, or the like. Moreover, the pressure-sensitive adhesive may be any of an emulsion type, a solvent type, or a solvent-less type, and may be either a crosslinked type or a non-crosslinked type.

The thickness of the pressure-sensitive adhesive layer 12 is generally approximately from 1 to 300 μm, preferably from 5 to 100 μm, but may be changed as appropriate in accordance with the use of the pressure-sensitive adhesive sheet 1.

The pressure-sensitive adhesive layer 12 may be formed by preparing a coating agent containing the pressure-sensitive adhesive that will constitute the pressure-sensitive adhesive layer 12, and also a solvent if desired, applying the coating agent onto the release treated surface of the release liner 13 using a coater such as a roll coater, a knife coater, a roll knife coater, an air knife coater, a die coater, a bar coater, a gravure coater, or a curtain coater, and drying.

Next, as shown in FIG. 1(c), the substrate 11 is superposed onto the surface of the pressure-sensitive adhesive layer 12, thus obtaining a laminate comprising the substrate 11, the pressure-sensitive adhesive layer 12, and the release liner 13. Examples of the material of the substrate 11 include a resin film, a metal foil, paper, a resin film having metal deposited thereon by vapor deposition, paper having metal deposited thereon by vapor deposition, fabric, nonwoven fabric, or a laminate of the above. These materials may contain any of various additives such as inorganic fillers, organic fillers, and ultraviolet absorbers.

The surface of the material may have a decorative layer formed thereon by a method such as printing, painting, transfer printing, vapor deposition, or sputtering, or may have formed thereon an undercoat layer such as an adhesion facilitating coat for forming such a decorative layer, or a gloss adjusting coat, or may have formed thereon a topcoat layer such as a hard coat, an antifouling coat, or a surface roughness or specular gloss adjusting coat. Moreover, such a decorative layer, undercoat layer or topcoat layer may be formed over the whole surface of the material, or may be formed on only part surface of the material.

As a resin film, there can be used, for example, a film or a foamed film made of a resin such as a polyolefin such as polyethylene or polypropylene, a polyester such as polyethylene terephthalate or polybutylene terephthalate, polyvinyl chloride, polystyrene, a polyurethane, a polycarbonate, a polyamide, a polyimide, polymethyl methacrylate, polybutene, polybutadiene, polymethylpentene, an ethylene-vinyl acetate copolymer, an ethylene-(meth)acrylic acid copolymer, an ethylene- (meth) acrylate ester copolymer, an ABS resin, or an ionomer resin, or a thermoplastic elastomer containing a component such as a polyolefin, a polyurethane, polystyrene, polyvinyl chloride or a polyester, or a laminated film of the above. As the resin film, a commercially available one may used, or one formed by a casting method or the like using a casting sheet may be used. Moreover, as paper, for example, woodfree paper, glassine paper, coated paper, laminated paper, dust-free paper, or Japanese paper can be used.

There are no particular limitations on the above casting sheet, for example, any of various types of paper, or a resin film such as polyethylene terephthalate, polypropylene, polyethylene or the like that has been subjected to release treatment with a release agent of a silicone type, a polyester type, an acrylic type, an alkyd type, a urethane type or the like or a synthetic resin can be used. The thickness of the casting sheet is generally approximately 10 to 200 µm, preferably approximately 25 to 150 µm.

The thickness of the substrate 11 is generally approximately from 1 to 500 µm, preferably from 3 to 300 µm, but may be changed as appropriate in accordance with the use of the pressure-sensitive adhesive sheet 1.

Next, as shown in FIG. 1(d), the release liner 13 is peeled off from the pressure-sensitive adhesive layer 12, then, as shown in FIG. 1(e), through-holes 2 are formed in the laminate comprising the substrate 11 and the pressure-sensitive adhesive layer 12 such as to pass through the laminate, and then, as shown in FIG. 1(f), the release liner 13 is superposed again onto the pressure-sensitive adhesive layer 12, whereby a pressure-sensitive adhesive sheet 1 is obtained.

In the present embodiment, the formation of the through-holes 2 is carried out through laser processing using a carbon dioxide ($CO_2$) laser. The $CO_2$ laser irradiation conditions are made to be as follows.

Pulse width: 1 to 140 µsec
Pulse energy at each processing point: 0.01 to 3.0 mJ
Beam spot diameter at each processing point: 30 to 160 µm
Frequency: 100 Hz to 100 kHz The number of shots (the number of times the irradiation with the laser must be carried out to form one through-hole) may be set as appropriate in accordance with the thickness, material, and so on of the pressure-sensitive adhesive layer 12 and the substrate 11. If the irradiation with the laser is carried out further after a through-hole 2 has been formed, then the shape of the formed through-hole 2 may collapse, and hence it is preferable to make the number of shots of the laser irradiation only a necessary and sufficient number. In the case that the number of shots is two or more, the pulse width may be changed for each shot. In this case, it is preferable to make the pulse width shorten for the final shot, whereby the diameter of the through-holes 2 can be made to be smaller at the surface of the substrate 11 or the pressure-sensitive adhesive surface of the pressure-sensitive adhesive layer 12.

The magnitude of the pulse energy may be controlled through the frequency, or may be controlled by using an optical component such as anAOM (Acousto-Optic Modulator). Moreover, in the present embodiment, the processing points are on the pressure-sensitive adhesive surface of the pressure-sensitive adhesive layer 12. The laser irradiation apparatus used may be one with an image forming optical system, or one with a focal point optical system; the image formation point in the former case, and the focal point in the latter case, is preferably the processing point.

Moreover, the through-holes 2 formed through the above laser processing are preferably made to have a diameter in the substrate 11 and the pressure-sensitive adhesive layer 12 of from 0.1 to 200 µm, preferably from 0.1 to 150 µm, a diameter at the surface of the substrate 11 of from 0.1 to 42 µm, preferably from 0.1 to 40 µm, and a hole density of from 30 to 50,000 per 100 $cm^2$, preferably 100 to 10,000 per 100 $cm^2$.

Through the laser processing with the $CO_2$ laser following the above irradiation conditions, the through-holes 2 are made to have a diameter in the substrate 11 and the pressure-sensitive adhesive layer 12 and a diameter at the surface of the substrate 11 within the above ranges, whereby air or gas can readily escape from the through-holes 2, and yet the through-holes 2 are not readily visible with the naked eye at the surface of the substrate 11, and hence the appearance of the pressure-sensitive adhesive sheet 1 is excellent.

If the hole density of the through-holes 2 is less than 30 per 100 $cm^2$, then it will be difficult for air or gas to escape, whereas if the hole density of the through-holes 2 is greater than 50,000 per 100 $cm^2$, then the mechanical strength of the pressure-sensitive adhesive sheet 1 will drop.

Here, in the case that the substrate 11 satisfies the following conditions, the through-holes 2 become invisible to the naked eye at the surface of the substrate 11, and hence the appearance of the pressure-sensitive adhesive sheet 1 is further improved.

(1) The surface roughness (Ra) is not less than 0.03 µm, preferably not less than 0.1 µm, particularly preferably not less than 0.14 µm.
(2) In the $L^*a^*b^*$ color system, in the case that the chroma ($C^*$) is not more than 60, the lightness ($L^*$) is not more than 60, preferably not more than 55, whereas in the case that the chroma (C*) is greater than 60, the lightness (L*) is not more than 85, preferably not more than 80.

(3) The contrast ratio is not less than 90%, preferably not less than 95%.

Here, the surface roughness (Ra: Roughness average) is in accordance with JISB0601. L*, a*, b* and C* are in accordance with JIS Z8729, the relationship between C*, a* and b* being given by $C^*=(a^{*2}+b^{*2})^{1/2}$. The contrast ratio is in accordance with JIS K5400.

In the case that the pressure-sensitive adhesive sheet 1 is to be used under an environment in which liquid such as water or gasoline may become attached after the pressure-sensitive adhesive sheet 1 has been stuck on, the $CO_2$ laser irradiation conditions are preferably made to be as follows.
Pulse width: 1 to 100 μsec
Pulse energy at each processing point: 0.01 to 2.1 mJ
Beam spot diameter at each processing point: 30 to 90 μm
Frequency: 100 Hz to 100 kHz Moreover, the through-holes 2 formed through the above laser processing are made to have a diameter in the substrate 11 and the pressure-sensitive adhesive layer 12 of from 0.1 to 125 μm, a diameter at the surface of the substrate 11 of from 0.1 to 42 μm, and a hole density of from 30 to 50,000 per 100 $cm^2$.

Through the laser processing with the $CO_2$ laser following the above irradiation conditions, the through-holes 2 are made to have a diameter in the substrate 11 and the pressure-sensitive adhesive layer 12 and a diameter at the surface of the substrate 11 within the above ranges, whereby even in the case that liquid such as water or gasoline becomes attached to the pressure-sensitive adhesive sheet 1 after the pressure-sensitive adhesive sheet 1 has been stuck onto an adherend, entering of this liquid into the through-holes 2 from the pressure-sensitive adhesive sheet front surface or from between the adherend and the pressure-sensitive adhesive surface and swelling portions around the peripheries of the through-holes 2 can be prevented, and hence the good appearance of the pressure-sensitive adhesive sheet 1 can be maintained.

Moreover, in the case that the pressure-sensitive adhesive sheet 1 is stretched by an elongation of up to 3%, the $CO_2$ laser irradiation conditions are preferably made to be as follows. Note that "stretched" here may be stretching when the pressure-sensitive adhesive sheet 1 is stuck onto the adherend, or may be stretching that occurs through the ambient temperature changing or the like after the pressure-sensitive adhesive sheet 1 has been is stuck onto the adherend.
Pulse width: 1 to 70 μsec
Pulse energy at each processing point: 0.01 to 1.5 mJ
Beam spot diameter at each processing point: 30 to 60 μm
Frequency: 100 Hz to 100 kHz Furthermore, the surface roughness (Ra) of the substrate 11 is made to be not less than 0.1 μm, and the through-holes 2 formed through the above laser processing are made to have a diameter in the substrate 11 and the pressure-sensitive adhesive layer 12 of from 0.1 to 85 μm, a diameter at the surface of the substrate 11 of from 0.1 to 42 μm, and a hole density of from 30 to 50,000 per 100 $cm^2$.

By stipulating the surface roughness (Ra) of the substrate 11 to be as above, and making the through-holes 2 have a diameter in the substrate 11 and the pressure-sensitive adhesive layer 12 and a diameter at the surface of the substrate 11 within the above ranges through the laser processing with the $CO_2$ laser following the above irradiation conditions, even in the case that the pressure-sensitive adhesive sheet 1 is stretched by an elongation of up to 3%, the through-holes 2 will not be readily visible with the naked eye on the surface of the substrate 11.

In the present embodiment, the pressure-sensitive adhesive surface of the pressure-sensitive adhesive layer 12 in the laminate comprising the substrate 11 and the pressure-sensitive adhesive layer 12 is irradiated directly with the $CO_2$ laser. In the case of a $CO_2$ laser, the through-holes 2 often become tapered, narrowing toward a front tip thereof, and hence by carrying out the laser processing from the pressure-sensitive adhesive layer 12 side as described above, the diameter of the through-holes 2 becomes smaller on the substrate 11 side than on the pressure-sensitive adhesive layer 12 side, and hence it becomes easy to control the diameter of the through-holes 2 at the surface of the substrate 11 to be within the above range described earlier (0.1 to 42 μm).

Figure 2:
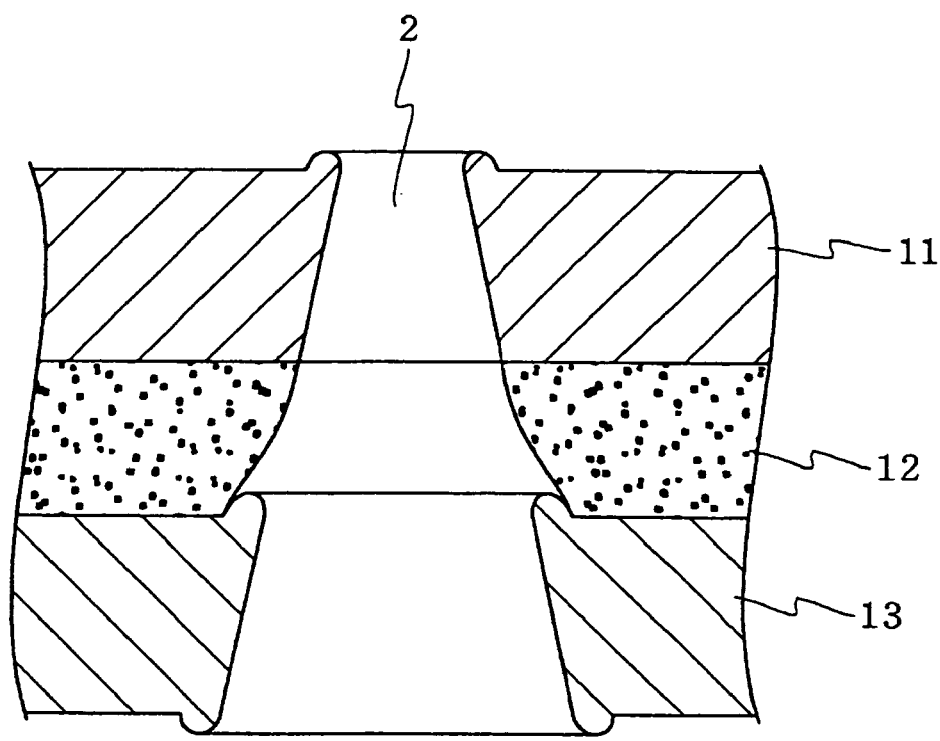
FIG. 2 consists of sectional views showing an example of a method of manufacturing the pressure-sensitive adhesive sheet according to the embodiment of the present invention.
Figure 2:
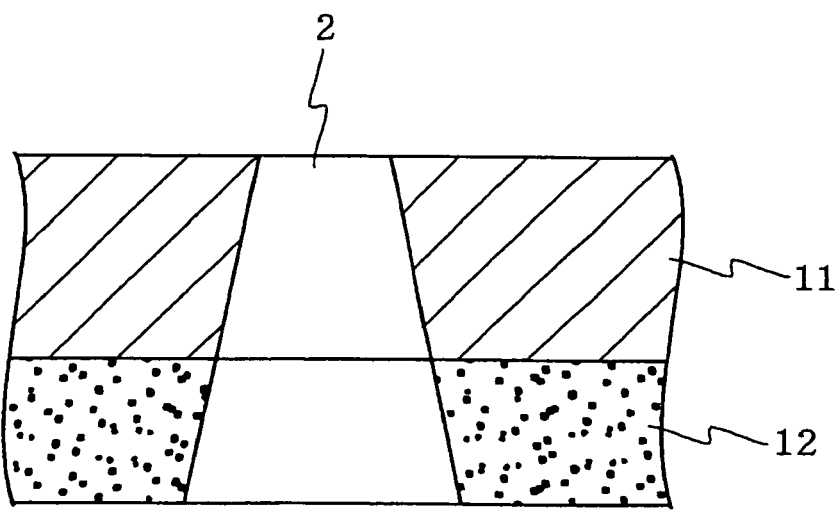

Moreover, in the case of irradiating with the laser from the release liner 13 side in a state with a release liner 13 laminated on the pressure-sensitive adhesive layer 12, depending on the material of the release liner 13, as shown in FIG. 2(a), melted matter (dross) from the release liner 13 formed around the openings of the through-holes 2 may cause widening of the openings of the through-holes 2 in the pressure-sensitive adhesive layer 12, and in this case the degree of precision of the diameter and the hole density of the through-holes 2 formed in the pressure-sensitive adhesive sheet 1 will be lowered. Moreover, if the openings of the through-holes 2 in the pressure-sensitive adhesive layer 12 are widened, then the space inside the through-holes 2 becomes bigger, and hence after the pressure-sensitive adhesive sheet 1 has been stuck onto an adherend, air in the through-holes 2 or water or the like entering the through-holes 2 may have some effect on the surface of the pressure-sensitive adhesive sheet 1. Such problems are particularly prone to arise in the case that the release liner 13 is made of a resin such as polyethylene terephthalate or polypropylene.

In contrast with this, if the release liner 13 is temporarily peeled off and then the pressure-sensitive adhesive layer 12 is irradiated directly with the laser as in the present embodiment, then as shown in FIG. 2(b), through-holes 2 can be formed for which there is no widening of the openings of the through-holes 2 in the pressure-sensitive adhesive layer 12, and hence the degree of precision of the diameter and the hole density is high, and the space inside the through-holes 2 is small. Moreover, when irradiating the pressure-sensitive adhesive layer 12 with the laser, by making the release liner 13 be not present therebetween, the laser irradiation time can be shortened, or the laser output energy can be reduced. If the laser output energy is reduced, then thermal damage on the pressure-sensitive adhesive layer 12 and the substrate 11 will be reduced, and hence it will be possible to form through-holes 2 of uniform shape with little dross and so on.

In the present embodiment, in the case that a substrate 11 formed by a casting method or the like using a casting sheet is used, the casting sheet is laminated on the surface of the substrate 11. Moreover, in the present embodiment, before carrying out the laser processing, a peelable protective sheet may be laminated onto the surface of the substrate (on which a casting sheet has not been laminated) 11 at a desired stage. As the protective sheet, for example a publicly known pressure-sensitive adhesive protective sheet comprising a substrate and a removable pressure-sensitive adhesive layer can be used.

In the case that dross becomes attached around the openings of the through-holes 2 through the laser processing, through a casting sheet or protective sheet being present on the surface of the substrate 11, the dross will become attached to the casting sheet or protective sheet rather than the substrate 11, and hence the appearance of the pressure-sensitive adhesive sheet 1 can be better maintained.

In the above case, when irradiating with the laser from the pressure-sensitive adhesive layer 12 side, the through-holes 2 must be formed in at least the pressure-sensitive adhesive layer 12 and the substrate 11; the through-holes 2 may formed as far as part way through the casting sheet or protective sheet, or may pass completely through the casting sheet or protective sheet.

In the present embodiment, the pressure-sensitive adhesive surface of the pressure-sensitive adhesive layer 12 was irradiated with the $CO_2$ laser directly, but the irradiation with the $CO_2$ laser may instead be carried out from the release liner 13 side so as to form through-holes 2 passing through the release liner 13, the pressure-sensitive adhesive layer 12 and the substrate 11. In this case, the processing points are on the non-release treated surface of the release liner 13.

Moreover, in the present embodiment, the irradiation with the $CO_2$ laser was carried out from the pressure-sensitive adhesive layer 12 side, but the irradiation with the $CO_2$ laser may instead be carried out from the substrate 11 side, or in the case that a casting sheet or protective sheet is present on the substrate 11, on the laminate from the casting sheet or protective sheet side, so as to form through-holes 2 that penetrate through at least the substrate 11 and the pressure-sensitive adhesive layer 12. In these cases, the processing points are on the surface of the substrate 11, the casting sheet or the protective sheet.

Furthermore, in the present embodiment, the pressure-sensitive adhesive layer 12 was formed on the release liner 13, and then the substrate 11 was stuck onto the formed pressure-sensitive adhesive layer 12, but there is no limitation to this in the present invention, for example the pressure-sensitive adhesive layer 12 may be formed on the substrate 11 directly.

When sticking the pressure-sensitive adhesive sheet 1 obtained as described above onto an adherend, firstly the release liner 13 is peeled off from the pressure-sensitive adhesive layer 12. In the case that there is a casting sheet or protective sheet through which the through-holes 2 do not penetrate on the substrate 11, the casting sheet or protective sheet is peeled off before stripping off the release liner 13. In the case that the through-holes 2 penetrate through such a casting sheet or protective sheet, the casting sheet or protective sheet may be peeled off at this stage, or may be peeled off after the pressure-sensitive adhesive sheet 1 has been stuck on.

Next, the pressure-sensitive adhesive surface of the pressure-sensitive adhesive layer 12 that has been exposed is made to be in close contact with the adherend, and then the pressure-sensitive adhesive sheet 1 is pressed onto the adherend. At this time, air between the adherend and the pressure-sensitive adhesive surface of the pressure-sensitive adhesive layer 12 escapes from the through-holes 2 formed in the pressure-sensitive adhesive sheet 1 to the outside of the pressure-sensitive adhesive sheet surface, and hence air tends not to be caught up between the adherend and the pressure-sensitive adhesive surface, i.e. air entrapment is prevented from occurring. Even if air is caught up so that air entrapment occurs, by re-pressing the air-entrapped portion or an air-entrapped portion surrounding portion including the air-entrapped portion, the air can be made to escape from the through-holes 2 to the outside of the pressure-sensitive adhesive sheet surface, thus eliminating the air entrapment. Such elimination of air entrapment is possible even after a long time has elapsed after the sticking on of the pressure-sensitive adhesive sheet 1.

Moreover, even if gas is emitted from the adherend or gas passes through the adherend after the pressure-sensitive adhesive sheet 1 has been stuck onto the adherend, this gas will escape from the through-holes 2 formed in the pressure-sensitive adhesive sheet 1 to the outside of the pressure-sensitive adhesive sheet surface, whereby the pressure-sensitive adhesive sheet 1 is prevented from blistering.

As described above, according to the pressure-sensitive adhesive sheet 1, air entrapment and blistering can be prevented or eliminated through the through-holes 2, and yet the through-holes 2 are not readily visible at the surface of the substrate 11, and hence the appearance is excellent.

The above embodiment has been described for facilitating understanding of the present invention, and not for limiting the present invention. The various elements described in the above embodiment are thus deemed to also include all design modifications and equivalents falling under the technical scope of the present invention.

For example, the pressure-sensitive adhesive sheet 1 in the present embodiment has the release liner 13, but there is no limitation to this in the present invention; the pressure-sensitive adhesive sheet 1 may have no release liner 13. Moreover, there are no particular limitations on the size, shape and so on of the pressure-sensitive adhesive sheet 1 in the present embodiment. For example, the pressure-sensitive adhesive sheet 1 may be a tape comprising only the substrate 11 and the pressure-sensitive adhesive layer 12 (a pressure-sensitive adhesive tape), and may also be rolled up into a roll.

EXAMPLES

Following is a more detailed description of the present invention through examples and so on; however, the scope of the present invention is not limited by these examples and so on.

Example 1

A solvent type acrylic pressure-sensitive adhesive (made by Lintec, PK) coating agent was applied using a knife coater such that the thickness after drying would be 30 µm onto the release treated surface of a release liner (made by LINTEC, FPM-11, thickness: 175 µm) obtained by laminating both surfaces of woodfree paper with a polyethylene resin and subjecting one surface to release treatment with a silicone type release agent, and drying was carried out for 1 minute at 90° C. A black opaque substrate (thickness: 100 µm) made of a polyvinyl chloride resin having a surface roughness (Ra) of 0.266 µm, a chroma (C*) in the L*a*b* color system of 0.34 and a lightness (L*) of 26.56, and a contrast ratio of 99.9% was superposed onto the pressure-sensitive adhesive layer thus formed, whereby a laminate having a three-layer structure was obtained.

The measurement of the surface roughness (Ra) was carried out in accordance with JIS B0601, using an SV-3000S4 measurement apparatus made by MITUTOYO CORPORATION with a cutoff value λc of 0.8 mm and an evaluation length ln of 10 mm. The measurement of the chroma (C*) and the lightness (L*) was carried out in accordance with JIS Z8729, by reflectometry using a simultaneous measurement type spectral color difference meter (made by NIPPON DENSHOKU INDUSTRIES CO., LTD., SQ-2000) as the measurement apparatus, a white board (L*=92.47, a*=0.61, b*=2.90) as a sample-holding stage, and a C light source with a 2° field (C/2) as a light source. The measurement of the contrast ratio was carried out in accordance with JIS K5400, using a SPECTRAFLASH SF600 PlUS CTC (spectrophotometer) made by Datacolor International (DCI) as the measurement apparatus. These measurement methods were the same hereinafter.

The release liner was peeled off from the laminate, and the laminate was irradiated with a $CO_2$ laser under the following conditions from the pressure-sensitive adhesive layer side, thus forming at a hole density of 2500 per 100 $cm^2$ through-holes having a diameter at the substrate surface of approximately 30 µm and a diameter at the pressure-sensitive adhesive surface of approximately 80 µm (the diameter is maximum at the pressure-sensitive adhesive surface). The release liner was then superposed again onto the pressure-sensitive adhesive layer, whereby a pressure-sensitive adhesive sheet was obtained.

$CO_2$ Laser Irradiation Conditions
Pulse width: 50 µsec
Pulse energy at each processing point: 0.85 mJ
Beam spot diameter at each processing point: 50 µm
Number of shots: 2
Frequency: 1 kHz

Example 2

The release liner was peeled off from a laminate produced as in Example 1, and the laminate was irradiated with a $CO_2$ laser under the following conditions from the pressure-sensitive adhesive layer side, thus forming at a hole density of 2500 per 100 $cm^2$ through-holes having a diameter at the substrate surface of approximately 25 µm and a diameter at the pressure-sensitive adhesive surface of approximately 80 µm (the diameter is maximum at the pressure-sensitive adhesive surface). The release liner was then superposed again onto the pressure-sensitive adhesive layer, whereby a pressure-sensitive adhesive sheet was obtained.

$CO_2$ Laser Irradiation Conditions
Pulse width: 50 µsec ($1^{st}$ shot)/45 µsec ($2^{nd}$ shot)
Pulse energy at each processing point: 0.85 mJ ($1^{st}$ shot)/0.77 mJ ($2^{nd}$ shot)
Beam spot diameter at each processing point: 50 µm
Number of shots: 2
Frequency: 1 kHz

Example 3

The release liner was peeled off from a laminate produced as in Example 1, and the laminate was irradiated with a $CO_2$ laser under the following conditions from the pressure-sensitive adhesive layer side, thus forming at a hole density of 2500 per 100 $cm^2$ through-holes having a diameter at the substrate surface of approximately 25 µm and a diameter at the pressure-sensitive adhesive surface of approximately 75 µm (the diameter is maximum at the pressure-sensitive adhesive surface). The release liner was then superposed again onto the pressure-sensitive adhesive layer, whereby a pressure-sensitive adhesive sheet was obtained.

$CO_2$ Laser Irradiation Conditions
Pulse width: 20 µsec
Pulse energy at each processing point: 0.35 mJ
Beam spot diameter at each processing point: 50 µm
Number of shots: 2
Frequency: 1 kHz

Example 4

The release liner was peeled off from a laminate produced as in Example 1, and the laminate was irradiated with a $CO_2$ laser under the following conditions from the pressure-sensitive adhesive layer side, thus forming at a hole density of 2500 per 100 $cm^2$ through-holes having a diameter at the substrate surface of approximately 30 µm and a diameter at the pressure-sensitive adhesive surface of approximately 110 µm (the diameter is maximum at the pressure-sensitive adhesive surface). The release liner was then superposed again onto the pressure-sensitive adhesive layer, whereby a pressure-sensitive adhesive sheet was obtained.

$CO_2$ Laser Irradiation Conditions
Pulse width: 27 µsec
Pulse energy at each processing point: 0.35 mJ
Beam spot diameter at each processing point: 80 µm
Number of shots: 5
Frequency: 1 kHz

Example 5

The release liner was peeled off from a laminate produced as in Example 1, and the laminate was irradiated with a $CO_2$ laser under the following conditions from the pressure-sensitive adhesive layer side, thus forming at a hole density of 2500 per 100 $cm^2$ through-holes having a diameter at the substrate surface of approximately 35 µm and a diameter at the pressure-sensitive adhesive surface of approximately 90 µm (the diameter is maximum at the pressure-sensitive adhesive surface). The release liner was then superposed again onto the pressure-sensitive adhesive layer, whereby a pressure-sensitive adhesive sheet was obtained.

$CO_2$ Laser Irradiation Conditions
Pulse width: 80 µsec ($1^{st}$ shot)/20 µsec ($2^{nd}$ shot)
Pulse energy at each processing point: 0.6 mJ ($1^{st}$ shot)/0.25 mJ ($2^{nd}$ shot)
Beam spot diameter at each processing point: 50 µm
Number of shots: 2
Frequency: 1 kHz

Example 6

The release liner was peeled off from a laminate produced as in Example 1, and the laminate was irradiated with a $CO_2$ laser under the following conditions from the pressure-sensitive adhesive layer side, thus forming at a hole density of 2500 per 100 $cm^2$ through-holes having a diameter at the substrate surface of approximately 40 µm and a diameter at the pressure-sensitive adhesive surface of approximately 100 µm (the diameter is maximum at the pressure-sensitive adhesive surface). The release liner was then superposed again onto the pressure-sensitive adhesive layer, whereby a pressure-sensitive adhesive sheet was obtained.

$CO_2$ Laser Irradiation Conditions
Pulse width: 50 µsec
Pulse energy at each processing point: 2.0 mJ
Beam spot diameter at each processing point: 50 µm
Number of shots: 1
Frequency: 1 kHz

Example 7

The release liner was peeled off from a laminate produced as in Example 1, and the laminate was irradiated with a $CO_2$ laser under the following conditions from the pressure-sensitive adhesive layer side, thus forming at a hole density of 2500 per 100 $cm^2$ through-holes having a diameter at the substrate surface of approximately 40 µm and a diameter at the pressure-sensitive adhesive surface of approximately 130 µm (the diameter is maximum at the pressure-sensitive adhesive surface). The release liner was then superposed again onto the pressure-sensitive adhesive layer, whereby a pressure-sensitive adhesive sheet was obtained.

$CO_2$ Laser Irradiation Conditions

Pulse width: 120 μsec (1st shot)/20 μsec (2nd shot)
Pulse energy at each processing point: 0.9 mJ (1st shot)/0.25 mJ (2nd shot)
Beam spot diameter at each processing point: 70 μm
Number of shots: 2
Frequency: 1 kHz

Example 8

The release liner was peeled off from a laminate produced as in Example 1, and the laminate was irradiated with a $CO_2$ laser under the following conditions from the pressure-sensitive adhesive layer side, thus forming at a hole density of 2500 per 100 cm$^2$ through-holes having a diameter at the substrate surface of approximately 40 μm and a diameter at the pressure-sensitive adhesive surface of approximately 130 μm (the diameter is maximum at the pressure-sensitive adhesive surface). The release liner was then superposed again onto the pressure-sensitive adhesive layer, whereby a pressure-sensitive adhesive sheet was obtained.
$CO_2$ Laser Irradiation Conditions
Pulse width: 40 μsec
Pulse energy at each processing point: 0.7 mJ
Beam spot diameter at each processing point: 100 μm
Number of shots: 5
Frequency: 1 kHz

Example 9

A laminate having a three-layer structure was produced as in Example 1, except that a release liner (made by LINTEC, SP-PET3811, thickness: 38 μm) obtained by subjecting one surface of a polyethylene terephthalate film to release treatment with a silicone type release agent was used as the release liner.

The laminate obtained was irradiated with a $CO_2$ laser under the following conditions from the release liner side of the laminate, thus forming at a hole density of 2500 per 100 cm$^2$ through-holes having a diameter at the substrate surface of approximately 25 μm and a diameter at the pressure-sensitive adhesive surface of approximately 65 μm (the diameter is maximum on the release liner side), whereby a pressure-sensitive adhesive sheet was obtained.
$CO_2$ Laser Irradiation Conditions
Pulse width: 50 μsec
Pulse energy at each processing point: 0.85 mJ
Beam spot diameter at each processing point: 50 μm
Number of shots: 3
Frequency: 1 kHz

Example 10

Using as a casting sheet a polyethylene terephthalate film (made by DUPONT TEIJIN FILMS Japan Limited, U4Z-50, thickness: 50 μm) one surface of which had been subjected to release treatment, a black opaque substrate (thickness: 50 μm) made of a polyvinyl chloride resin having a surface roughness (Ra) of 0.218 μm, a chroma (C*) in the L*a*b* color system of 0.78 and a lightness (L*) of 27.33, and a contrast ratio of 97.0% was formed.

On the other hand, a pressure-sensitive adhesive layer was formed on a release liner as in Example 1, except that the thickness of the pressure-sensitive adhesive layer was made to be 10 μm, and then this pressure-sensitive adhesive layer and the casting sheet-absent surface of the above substrate with casting sheet were superposed together firmly, whereby a laminate having a four-layer structure was obtained.

The laminate obtained was irradiated with a $CO_2$ laser under the same conditions as in Example 1 from the casting sheet side of the laminate, thus forming at a hole density of 2500 per 100 cm$^2$ through-holes having a diameter at the substrate surface of approximately 40 μm and a diameter at the pressure-sensitive adhesive surface of approximately 30 pm (the diameter is maximum on the casting sheet side), whereby a pressure-sensitive adhesive sheet was obtained.

Example 11

A laminate having a three-layer structure was produced as in Example 1, and then a polyethylene film with a removable pressure-sensitive adhesive layer (made by SUMIRON CO., LTD., E-212, thickness: 60 μm) was further stuck as a protective sheet onto the surface of the substrate of the laminate, whereby a laminate having a four-layer structure was obtained.

The release liner was peeled off from the laminate obtained, and the laminate was irradiated with a $CO_2$ laser under the same conditions as in Example 1 from the pressure-sensitive adhesive layer side, thus forming at a hole density of 2500 per 100 cm$^2$ through-holes having a diameter at the substrate surface of approximately 25 μm and a diameter at the pressure-sensitive adhesive surface of approximately 80 μm (the diameter is maximum at the pressure-sensitive adhesive surface). The release liner was then superposed again onto the pressure-sensitive adhesive layer, whereby a pressure-sensitive adhesive sheet was obtained.

Example 12

A pressure-sensitive adhesive layer was formed as in Example 1 on the release treated surface of a release liner (made by TOYOBO CO., LTD., Crisper G-7223, thickness: 125 μm) obtained by subjecting one surface of a polyethylene terephthalate film to release treatment with a silicone type release agent, and a black opaque substrate (made by TEIJIN CHEMICALS LTD., ECOCAL αseries black film, thickness: 45 μm) comprising a polyester type thermoplastic elastomer layer (thickness: 40 μm) with an anchor coat layer (thickness: 1 μm), a black colored layer (thickness: 2 μm) and a colorless transparent acrylic coating (thickness: 2 μm) laminated thereon in this order, and having a surface roughness (Ra) of 0.040 μm, a chroma (C*) in the L*a*b* color system of 1.77 and a lightness (L*) of 26.67, and a contrast ratio of 99.9% was superposed onto the pressure-sensitive adhesive layer. A polyethylene film with removable pressure-sensitive adhesive layer (made by SUMIRON CO., LTD., E-2035, thickness: 60 μm) was then further stuck as a protective sheet onto the surface of the substrate, whereby a laminate having a four-layer structure was obtained.

The release liner was peeled off from the laminate, and the laminate was irradiated with a $CO_2$ laser under the following conditions from the pressure-sensitive adhesive layer side, thus forming at a hole density of 2500 per 100 cm$^2$ through-holes having a diameter at the substrate surface of approximately 20 μm and a diameter at the pressure-sensitive adhesive surface of approximately 60 μm (the diameter is maximum at the pressure-sensitive adhesive surface). The release liner was then superposed again onto the pressure-sensitive adhesive layer, whereby a pressure-sensitive adhesive sheet was obtained.
$CO_2$ Laser Irradiation Conditions
Pulse width: 50 μsec
Pulse energy at each processing point: 0.85 mJ
Beam spot diameter at each processing point: 50 μm Number of shots: 1
Frequency: 1 kHz Comparative Example 1

The release liner was peeled off from a laminate produced as in Example 1, and the laminate was irradiated with a $CO_2$ laser under the following conditions from the pressure-sensitive adhesive layer side, thus forming at a hole density of 2500 per 100 $cm^2$ through-holes having a diameter at the substrate surface of approximately 80 μm and a diameter at the pressure-sensitive adhesive surface of approximately 200 μm (the diameter is maximum at the pressure-sensitive adhesive surface). The release liner was then superposed again onto the pressure-sensitive adhesive layer, whereby a pressure-sensitive adhesive sheet was obtained.
$CO_2$ Laser Irradiation Conditions
Pulse width: 200 μsec
Pulse energy at each processing point: 5.0 mJ
Beam spot diameter at each processing point: 180 μm
Number of shots: 4 Frequency: 1 kHz Comparative Example 2

The release liner was peeled off from a laminate produced as in Example 1, and the laminate was irradiated with a $CO_2$ laser under the following conditions from the pressure-sensitive adhesive layer side, thus forming at a hole density of 2500 per 100 $cm^2$ through-holes having a diameter at the substrate surface of approximately 60 μm and a diameter at the pressure-sensitive adhesive surface of approximately 120 μm (the diameter is maximum at the pressure-sensitive adhesive surface). There lease liner was then superposed again onto the pressure-sensitive adhesive layer, whereby a pressure-sensitive adhesive sheet was obtained.
$CO_2$ Laser Irradiation Conditions
Pulse width: 200 μsec
Pulse energy at each processing point: 2.0 mJ
Beam spot diameter at each processing point: 80 μm
Number of shots: 2
Frequency: 1 kHz Comparative Example 3

The release liner was peeled off from a laminate produced as in Example 1, and the laminate was irradiated with a $CO_2$ laser under the following conditions from the pressure-sensitive adhesive layer side, thus forming at a hole density of 2500 per 100 $cm^2$ through-holes having a diameter at the substrate surface of approximately 70 μm and a diameter at the pressure-sensitive adhesive surface of approximately 120 μm (the diameter is maximum at the pressure-sensitive adhesive surface). The release liner was then superposed again onto the pressure-sensitive adhesive layer, whereby a pressure-sensitive adhesive sheet was obtained.
$CO_2$ Laser Irradiation Conditions
Pulse width: 100 μsec
Pulse energy at each processing point: 5.0 mJ
Beam spot diameter at each processing point: 80 μm
Number of shots: 2
Frequency: 1 kHz Comparative Example 4

The release liner was peeled off from a laminate produced as in Example 1, and the laminate was irradiated with a $CO_2$ laser under the following conditions from the pressure-sensitive adhesive layer side, thus forming at a hole density of 2500 per 100 $cm^2$ through-holes having a diameter at the substrate surface of approximately 65 μm and a diameter at the pressure-sensitive adhesive surface of approximately 100 μm (the diameter is maximum at the pressure-sensitive adhesive surface). The release liner was then superposed again onto the pressure-sensitive adhesive layer, whereby a pressure-sensitive adhesive sheet was obtained.
$CO_2$ Laser Irradiation Conditions
Pulse width: 170 μsec
Pulse energy at each processing point: 3.2 mJ
Beam spot diameter at each processing point: 50 μm
Number of shots: 1
Frequency: 1 kHz Comparative Example 5

The release liner was peeled off from a laminate produced as in Example 1, and the laminate was irradiated with a $CO_2$ laser under the following conditions from the pressure-sensitive adhesive layer side, thus forming at a hole density of 2500 per 100 $cm^2$ through-holes having a diameter at the substrate surface of approximately 90 μm and a diameter at the pressure-sensitive adhesive surface of approximately 230 μm (the maximum diameter being at the pressure-sensitive adhesive surface). The release liner was then superposed again onto the pressure-sensitive adhesive layer, whereby a pressure-sensitive adhesive sheet was obtained.
$CO_2$ Laser Irradiation Conditions
Pulse width: 50 μsec
Pulse energy at each processing point: 1.4 mJ
Beam spot diameter at each processing point: 180 μm
Number of shots: 12
Frequency: 1 kHz

[Test]

For each of the pressure-sensitive adhesive sheets obtained in the Examples and the Comparative Examples, an air entrapment removability test and an appearance inspection (normal, stretched, immersed in hot water) were carried out as described below. The results are shown in Table 1.

Air entrapment removability test: The pressure-sensitive adhesive sheet from which any casting sheet or protective sheet had been peeled off and the release liner had been peeled off (size: 50 mm×50 mm) was stuck onto a 70 mm×70 mm melamine coated plate having therein a depression having the shape of part of a spherical surface with a diameter of 15 mm and a maximum depth of 1 mm (there was air entrapment between the depression and the pressure-sensitive adhesive sheet), and then the pressure-sensitive adhesive sheet was pressed on using a squeegee, and it was verified whether or not the air entrapment could be eliminated.
Pressure-sensitive adhesive sheets for which the result was that the pressure-sensitive adhesive sheet followed the depression in the melamine coated plate and hence the air entrapment was eliminated were marked as "O", and ones for which the pressure-sensitive adhesive sheet did not follow the depression in the melamine coated plate and hence the air entrapment was not eliminated (including ones for which even a small amount of air entrapment remained) were marked as "x".
Appearance inspection:
(1) Normal
The pressure-sensitive adhesive sheet from which any casting sheet or protective sheet had been peeled off and the release liner had been peeled off (size: 30 mm×30 mm) was stuck onto a white melamine coated plate, and it was inspected whether or not the through-holes could be seen on the surface of the pressure-sensitive adhesive sheet with the naked eye under indoor fluorescent lighting. The distance from the eyes to the pressure-sensitive adhesive sheet was made to be approximately 30 cm, and the angle from which the pressure-sensitive adhesive sheet was viewed was varied. Pressure-sensitive adhesive sheets for which the result was that the through-holes could not be seen were marked as "◯", and ones for which the through-holes could be seen were marked as "x".

(2) Stretched

The pressure-sensitive adhesive sheet from which any casting sheet or protective sheet had been peeled off and the release liner had been peeled off (size of inspected portion: 25 mm×100 mm) was stretched by 3% in one direction such that the length changed from 100 mm to 103 mm, and was stuck onto a white melamine coated plate in this state, and an inspection was carried out as above.

(3) Immersed in hot water

The pressure-sensitive adhesive sheet from which any casting sheet or protective sheet had been peeled off and the release liner had been peeled off (size: 30 mm×30 mm) was stuck onto a white melamine coated plate. After being left in this state for 24 hours, the pressure-sensitive adhesive sheet was immersed in hot water at 40° C. for 168 hours, and was then taken out and left for 48 hours, after which it was visually judged whether the appearance of the pressure-sensitive adhesive sheet had been marred through swelling of the through-hole portions or the like. Pressure-sensitive adhesive sheets for which the appearance was not marred were marked as "◯", and ones for which the appearance was marred were marked as "x".

TABLE 1

| | Air entrapment removability test | Appearance inspection | | |
|---|---|---|---|---|
| | | Normal | Stretched by 3% | Immersed in hot water |
| Example 1 | ◯ | ◯ | ◯ | ◯ |
| Example 2 | ◯ | ◯ | ◯ | ◯ |
| Example 3 | ◯ | ◯ | ◯ | ◯ |
| Example 4 | ◯ | ◯ | X | ◯ |
| Example 5 | ◯ | ◯ | X | ◯ |
| Example 6 | ◯ | ◯ | X | ◯ |
| Example 7 | ◯ | ◯ | X | X |
| Example 8 | ◯ | ◯ | X | X |
| Example 9 | ◯ | ◯ | ◯ | ◯ |
| Example 10 | ◯ | ◯ | ◯ | ◯ |
| Example 11 | ◯ | ◯ | ◯ | ◯ |
| Example 12 | ◯ | ◯ | X | ◯ |
| Comparative Example 1 | ◯ | X | X | X |
| Comparative Example 2 | ◯ | X | X | X |
| Comparative Example 3 | ◯ | X | X | X |
| Comparative Example 4 | ◯ | X | X | X |
| Comparative Example 5 | ◯ | X | X | X |

As can be seen from Table 1, for the pressure-sensitive adhesive sheets obtained in the Examples, the air escaping ability was excellent, and moreover the through-holes could not be seen with the naked eye. For the pressure-sensitive adhesive sheets obtained in Examples 1 to 3 and 9 to 11 in particular, even when stuck on stretched by a elongateion of 3%, the through-holes could not be seen with the naked eye, and hence the appearance was very good. Moreover, for the pressure-sensitive adhesive sheets obtained in Examples 1 to 6 and 9 to 12 in particular, the appearance was good even after immersing in hot water.

INDUSTRIAL APPLICABILITY

The method of producing a pressure-sensitive adhesive sheet according to the present invention is useful for producing a pressure-sensitive adhesive sheet for which air entrapment or blistering is prone to occur, and that is also required to have a good appearance.

The invention claimed is:

1. A method of producing a pressure-sensitive adhesive sheet that comprises at least a substrate and a base pressure-sensitive adhesive layer, the method comprising:
    directly irradiating a pressure-sensitive adhesive surface of the pressure-sensitive adhesive layer with a $CO_2$ laser and forming through-holes as precise, uniform through-holes in the pressure-sensitive adhesive sheet, the $CO_2$ laser having a pulse width of from 1 to 140 μsec, a pulse energy at each processing point of from 0.01 to 3.0 mJ, and a beam spot diameter at each processing point of from 30 to 160 μm, wherein a diameter of the through-holes is smaller on the substrate side than on the base pressure-sensitive adhesive layer side, and a diameter of the through-holes in the substrate and the base pressure-sensitive adhesive layer is from 0.1 to 200 μm and a diameter at a surface of the substrate is from 0.1 to 42 μm at a hole density of from 30 to 50,000 per 100 $cm^2$.

2. The method of producing a pressure-sensitive adhesive sheet according to claim 1, further comprising:
    at least one additional step of directly irradiating the pressure-sensitive adhesive surface of the pressure-sensitive adhesive layer with the $CO_2$ laser.

3. The method of producing a pressure-sensitive adhesive sheet according to claim 2, wherein the pulse width of the $CO_2$ laser is shorten in a last step of directly irradiating the pressure-sensitive adhesive surface of the pressure-sensitive adhesive layer with the $CO_2$ laser.

4. A method of producing a pressure-sensitive adhesive sheet that comprises at least a substrate, a base pressure-sensitive adhesive layer, and a release liner laminated on the pressure-sensitive adhesive layer, the method comprising:
    peeling the release liner from the pressure-sensitive adhesive layer,
    directly irradiating a pressure-sensitive adhesive surface of the pressure sensitive adhesive layer with a $CO_2$ laser having a pulse width of from 1 to 140 μsec, a pulse energy at each processing point of from 0.01 to 3.0 mJ, and a beam spot diameter at each processing point of from 30 to 160 μm, to form through-holes, wherein a diameter of the through-holes is smaller on the substrate side than on the base pressure-sensitive adhesive layer side, and a diameter of the through-holes in the substrate and the base pressure-sensitive adhesive layer is from 0.1 to 200 μm and a diameter at a surface of the substrate is from 0.1 to 42 μm at a hole density of from 30 to 50,000 per 100 $cm^2$, and laminating the release liner again on the pressure sensitive adhesive layer.

5. The method of producing a pressure-sensitive adhesive sheet according to claim 4, further comprising:
    at least one additional step of directly irradiating the pressure-sensitive adhesive surface of the pressure-sensitive adhesive layer with the $CO_2$ laser.

6. The method of producing a pressure-sensitive adhesive sheet according to claim 5, wherein the pulse width of the $CO_2$ laser is shorten in a last step of directly irradiating the pressure-sensitive adhesive surface of the pressure-sensitive adhesive layer with the $CO_2$ laser.

7. A method of producing a pressure-sensitive adhesive sheet that comprises at least a substrate and a base pressure-sensitive adhesive layer, the method comprising:
   directly irradiating a pressure sensitive adhesive surface of the pressure-sensitive adhesive sheet while a casting sheet or a peelable protective sheet comprising a substrate and a removable pressure-sensitive adhesive layer remains laminated on the surface of the substrate with a $CO_2$ laser having a pulse width of from 1 to 140 μsec, a pulse energy at each processing point of from 0.01 to 3.0 mJ, and a beam spot diameter at each processing point of from 30 to 160 μm, to form through-holes, wherein a diameter of the through-holes is smaller on the substrate side than on the base pressure-sensitive adhesive layer side, and a diameter of the through-holes in the substrate and the base pressure-sensitive adhesive layer is from 0.1 to 200 μm and a diameter at a surface of the substrate is from 0.1 to 42 μm at a hole density of from 30 to 50,000 per 100cm$^2$.

8. The method of producing a pressure-sensitive adhesive sheet according to claim 7, further comprising:
   at least one additional step of irradiating the pressure-sensitive adhesive layer with the $CO_2$ laser.

9. The method of producing a pressure-sensitive adhesive sheet according to claim 8, wherein the pulse width of the $CO_2$ laser is shorten in a last step of directly irradiating the pressure-sensitive adhesive surface of the pressure-sensitive adhesive layer with the $CO_2$ laser.

* * * * *